(12) United States Patent
Hakeem et al.

(10) Patent No.: US 10,351,148 B2
(45) Date of Patent: Jul. 16, 2019

(54) SYSTEM AND METHOD FOR SOUND DIRECTION DETECTION IN A VEHICLE

(71) Applicant: Ford Global Technologies, LLC, Dearborn, MI (US)

(72) Inventors: Mohannad Abdullah Hakeem, Dearborn, MI (US); Umer Khalid, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/749,434

(22) PCT Filed: Aug. 5, 2015

(86) PCT No.: PCT/US2015/043795
§ 371 (c)(1),
(2) Date: Jan. 31, 2018

(87) PCT Pub. No.: WO2017/023313
PCT Pub. Date: Feb. 9, 2017

(65) Prior Publication Data
US 2018/0237033 A1 Aug. 23, 2018

(51) Int. Cl.
*B60W 50/16* (2012.01)
*H04B 1/00* (2006.01)
(Continued)

(52) U.S. Cl.
CPC ......... *B60W 50/16* (2013.01); *B60R 11/0247* (2013.01); *B62D 1/04* (2013.01);
(Continued)

(58) Field of Classification Search
CPC ....... B60W 50/16; H04R 1/326; H04R 5/027; H04R 3/005; H04R 2430/21; H04R 2499/13; B62D 1/04; B60R 11/0247
See application file for complete search history.

(56) References Cited

U.S. PATENT DOCUMENTS 3,736,553 A 5/1973 Kermode
6,565,407 B1 5/2003 Woolington et al.
(Continued)

FOREIGN PATENT DOCUMENTS

KR 1020130124707 A 11/2013

OTHER PUBLICATIONS

International Preliminary Report on Patentability for PCT Application No. PCT/US2015/043795 dated Aug. 25, 2017.
(Continued)

*Primary Examiner* — Ryan W Sherwin
(74) *Attorney, Agent, or Firm* — Frank Lollo; Neal, Gerber & Eisenberg LLP; James P. Muraff (57) ABSTRACT

A vehicle is provided comprising a cabin area, a steering wheel, a plurality of microphones positioned in the cabin area and configured to have pick-up sensitivity in select directions, and a cue generator configured to provide a haptic cue on the steering wheel in response to a sound detected by the plurality of microphones. Also provided are systems and methods for indicating a detected sound direction in a vehicle. A plurality of microphones are positioned in a vehicle cabin and configured to have pick-up sensitivity in select directions. A comparator is configured to compare the detected audio signals to identify a highest amplitude signal. And a cue generator is configured to provide haptic feedback at a vehicle cabin location associated with the microphone detecting the highest amplitude signal.

20 Claims, 3 Drawing Sheets

(51) Int. Cl.
  *B60R 11/02*  (2006.01)
  *B62D 1/04*  (2006.01)
  *H04R 1/32*  (2006.01)
  *H04R 3/00*  (2006.01)
  *H04R 5/027*  (2006.01)

(52) U.S. Cl.
  CPC ............... *H04B 1/00* (2013.01); *H04R 1/326* (2013.01); *H04R 3/005* (2013.01); *H04R 5/027* (2013.01); *H04R 2430/21* (2013.01); *H04R 2499/13* (2013.01)

(56) References Cited

U.S. PATENT DOCUMENTS

| | | |
|---|---|---|
| 8,054,988 B2 | 11/2011 | Schultz et al. |
| 8,774,952 B2 | 7/2014 | Kim et al. |
| 2002/0150262 A1 | 10/2002 | Carter |
| 2005/0074131 A1 | 4/2005 | McCall et al. |
| 2005/0213771 A1 | 9/2005 | Smaragdis et al. |
| 2008/0253589 A1 | 10/2008 | Trahms |
| 2010/0033313 A1 | 2/2010 | Keady et al. |
| 2013/0032002 A1 | 2/2013 | Kuntzel |
| 2014/0219471 A1 | 8/2014 | Deshpande et al. |
| 2016/0080861 A1* | 3/2016 | Helm ................. B60R 11/0247 381/86 |

OTHER PUBLICATIONS

International Search Report and the Written Opinion for PCT Application No. PCT/US2015/043795 dated Oct. 23, 2015.

* cited by examiner

SYSTEM AND METHOD FOR SOUND DIRECTION DETECTION IN A VEHICLE

CROSS-REFERENCE TO RELATED APPLICATIONS

This is the National Stage of International Application No. PCT/US2015/043795, filed on Aug. 5, 2015 and titled "System and Method for Sound Direction Detection in a Vehicle," which is incorporated by reference in its entirety.

TECHNICAL FIELD

This application generally relates to sound direction detection and more specifically, to sound direction detection in a vehicle.

BACKGROUND

When operating a vehicle, sounds coming from outside the vehicle, especially car horns, emergency vehicle sirens, and other customary warning or alarm sounds, can alert the vehicle operator to certain driving events, including an approaching emergency vehicle, another driver honking to grab the operator's attention, the sounding of an emergency warning system, or the like. In some cases, the vehicle operator may not notice or hear these sounds, even when they are loud, because the operator is preoccupied (e.g., with a phone conversation, talking to other passengers, or using a handheld device), has a volume of the vehicle audio system turned up high, or is wearing headphones or other noise-blocking device (e.g., ear plugs). In the case of hearing-impaired or deaf drivers, human detection of roadside sounds may not be an option at all.

In some instances, visual cues, such as the flashing lights of an emergency vehicle or the behavior of other drivers on the road, can alert the vehicle operator to the driving event producing the warning or alarm sounds, as an alternative or supplement to the audio cues. However, there are times when a more immediate reaction to the driving event, such as the reaction typically triggered by horns, sirens, and other audio cues, is desirable. Accordingly, there is still a need for an additional alert system in vehicles for notifying operators of sounds coming from outside the vehicle.

SUMMARY

The invention is intended to solve the above-noted problems by providing systems and methods for sound direction detection in a vehicle that are designed to, among other things, (1) provide the vehicle operator with haptic cues to represent sounds detected by microphones that are positioned within the vehicle and tailored to pick up predefined sounds, such as, for example, car honks, emergency vehicle sirens, and the like, and (2) provide the haptic cues at locations that correspond to a direction of the detected sound.

For example, one embodiment provides a vehicle comprising a cabin area, a steering wheel, a plurality of microphones positioned in the cabin area and configured to have pick-up sensitivity in select directions, and a cue generator configured to provide a haptic cue on the steering wheel in response to a sound detected by the plurality of microphones. In some cases, the vehicle further comprises a driver's seat within the cabin area, wherein the plurality of microphones are positioned in a vicinity of the driver's seat.

As another example, one embodiment provides a system for indicating a detected sound direction in a vehicle. The system comprises a plurality of microphones positioned in a vehicle cabin and configured to have pick-up sensitivity in select directions; a comparator configured to compare the detected audio signals to identify a highest amplitude signal; and a cue generator configured to provide haptic feedback at a vehicle cabin location associated with the microphone detecting the highest amplitude signal. In some cases, the cue generator includes a plurality of haptic devices mounted at a plurality of feedback locations on a steering wheel of the vehicle.

As yet another example, one embodiment provides a method of indicating a detected sound direction in a vehicle. The method comprises detecting an audio signal at each of a plurality of microphones positioned within a vehicle cabin; determining, using a comparator, a highest amplitude signal by comparing the detected audio signals; and activating a haptic device mounted in a vehicle cabin location and associated with the microphone that detected the highest amplitude signal. In some cases, the method further comprises selecting the haptic device from a plurality of haptic devices mounted on a steering wheel of the vehicle, each haptic device being associated with a respective one of the plurality of microphones. Also in some cases, the plurality of microphones can be configured to have pick-up sensitivity in select directions, and the vehicle cabin location of the haptic device can correspond to the pick-up sensitivity direction of the microphone that detected the highest amplitude signal.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1:
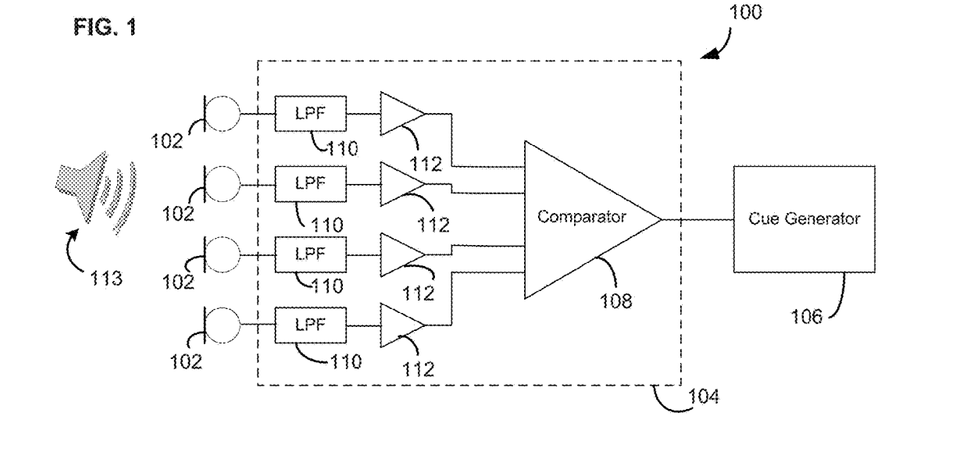
FIG. 1 is a block diagram of an example sound direction detection system in accordance with certain embodiments.

FIG. 1 illustrates an example system 100 for indicating a detected sound direction in a vehicle, in accordance with embodiments. As shown, the system 100 includes a plurality of microphones 102 positioned in different directions for detecting sounds in and around a vehicle, a sound direction detection circuit 104 for determining which of the microphones 102 most directly detected a select sound, and a cue generator 106 for providing haptic feedback that indicates a direction of the sound to the vehicle operator. In other embodiments, the plurality of microphones 102 may be replaced by other types of sensors for detecting the direction of a given sound.

In embodiments, the system 100 can be specifically designed for indicating a sound direction for certain predefined sounds originating from a source 113 outside the vehicle. For example, the microphones 102 can be specifically configured to detect vehicular horns (e.g., car, truck, bus, train etc.), emergency vehicle sirens (e.g., from ambulances, police cars, fire trucks, etc.), car alarms, and other audible warning sounds designed to alert the vehicle operator to a roadside condition or other event while driving (e.g., sounding of an emergency warning system sire or a nearby car alarm, an approaching emergency vehicle or train, a vehicle honking to get the vehicle operator's attention or to warn of an impending collision, etc.).

In some embodiments, the sound direction detection system 100 can be added to the vehicle 300 as an aftermarket add-on, for example, for hearing-impaired drivers or other individuals who are interested in receiving haptic cues that represent audible warning sounds on the road. In other embodiments, the system 100 can be a vehicle option provided to hearing-impaired or deaf drivers at the time of purchase.

According to embodiments, the sound direction detection circuit 104 can be a linear circuit comprising four circuit paths for connecting each of the microphones 102 to a comparator 108. When the microphones 102 pick up a sound, the comparator 108 compares audio signals received from each microphone 102 to determine which of the microphones 102 picked up the strongest audio signal. For example, the microphone 102 that is closest to the sound source 113 may produce an audio signal that is higher in amplitude than that of the signals produced by the other microphones 102. Accordingly, in some embodiments, the comparator 108 can be a voltage comparator that compares the amplitude values of the received audio signals and determines which value is largest. The comparator 108 generates an output identifying the microphone 102 that produced the highest amplitude signal (also referred to herein as the "primary detecting microphone"). The output of the comparator 108 can be provided to the cue generator 106, which utilizes the microphone identity information received from the comparator 108 to provide a corresponding haptic cue to the vehicle operator.

In certain embodiments, the comparator 108 can include two input comparators (not shown) coupled to an output comparator (not shown), each comparator having two inputs and one output. In such cases, each of the input comparators can be configured to compare audio signals from a respective pair of microphones 102 and determine which of the two microphones 102 in the pair captured the larger amplitude. The outputs of the input comparators can be provided to the output comparator, which compares the two amplitude values received from the input comparators to determine which of the received values is larger. An output of the output comparator can serve as the overall output of the comparator 108 and can identify which of the plurality of microphones 102 has detected an audio signal with the largest amplitude. In other embodiments, the comparator 108 can be any other type of electronic device for determining which of the microphones 102 detected the strongest audio signal, including, for example, a current comparator, an operational amplifier, a digital comparator, and the like.

As shown in FIG. 1, each circuit path between the microphones 102 and the comparator 108 can include a low pass filter ("LPF") 110 coupled to an output of the respective microphone 102 and an amplifier 112 coupled to an output of the low pass filter 108. Each amplifier 112 can be coupled to a respective one of the four inputs of the comparator 108 and can be configured to amplify an output of the filter 110. The low pass filters 108 can be configured to eliminate or remove ambient noise and/or unwanted frequencies from the audio signals received from the microphones 102. In some embodiments, the filters 110 can be configured to remove sounds from the audio signal that have a frequency outside of a desired frequency response range of the microphones 102. In some cases, the filters 110 can be other types of filters instead of low pass filters, such as, for example, bandpass filters or high pass filters, depending on the filtering needs required by the frequency range(s) assigned to the microphones 102.

In embodiments, the microphones 102 can be positioned at different locations within a cabin area of the vehicle, and can be any type of directional microphone that is designed to primarily pick up incoming sounds from a preset direction, side, or angle, such as, for example, unidirectional, cardioid, hypercardioid, or shotgun microphones. The preset direction or side can define the directionality or pick up sensitivity of the microphone 102. For example, the microphones 102 can be configured to have good sound quality or sensitivity on the preset side, but sounds coming from any other side may have very little gain or poor sound quality. In some embodiments, the microphones 102 may be configured to operate as a microphone array, with each microphone 102 covering a different preset sound detection direction in order to provide nearly 360 degree sound detection coverage of the vehicle or vehicle operator, as discussed in more detail with respect to FIG. 2.

In some embodiments, the microphones 102 can be configured to have a frequency response of 20 Hz to 20 kHz in order to reproduce, or effectively capture, all frequencies within the audible range of an average human. In other embodiments, the microphones 102 can be configured to have a frequency response that is tailored to one or more predefined sounds, such as, for example, car horns, emergency vehicle sirens, and the like. In such cases, the microphones 102 may be configured so that a desired range of frequencies are boosted, while frequencies above and below the desired range are attenuated. For example, an emergency vehicle siren typically operates at a frequency of about 700 Hertz (Hz), while a typical car horn may operate at a frequency of about 400 Hz. Accordingly, in some cases, the microphones 102 may be configured to be sensitive to frequencies below 1000 Hz, have a frequency response range of 200 Hz to 1000 Hz, or have other similar response patterns.

In others cases, the plurality of microphones 102 can include a variety of frequency response ranges. For example, one or more of the microphones 102 can be tailored to reproduce frequencies around 400 Hz (e.g., to be sensitive to car horns), and one or more microphones 102 can be tailored to reproduce frequencies around 700 Hz (e.g., to be sensitive to emergency vehicle sirens). As will be appreciated, the microphones 102 may have other frequency responses and/or sensitivity ranges depending on the needs of the vehicle operator and/or the environment in which the vehicle will be used.

Figure 2:
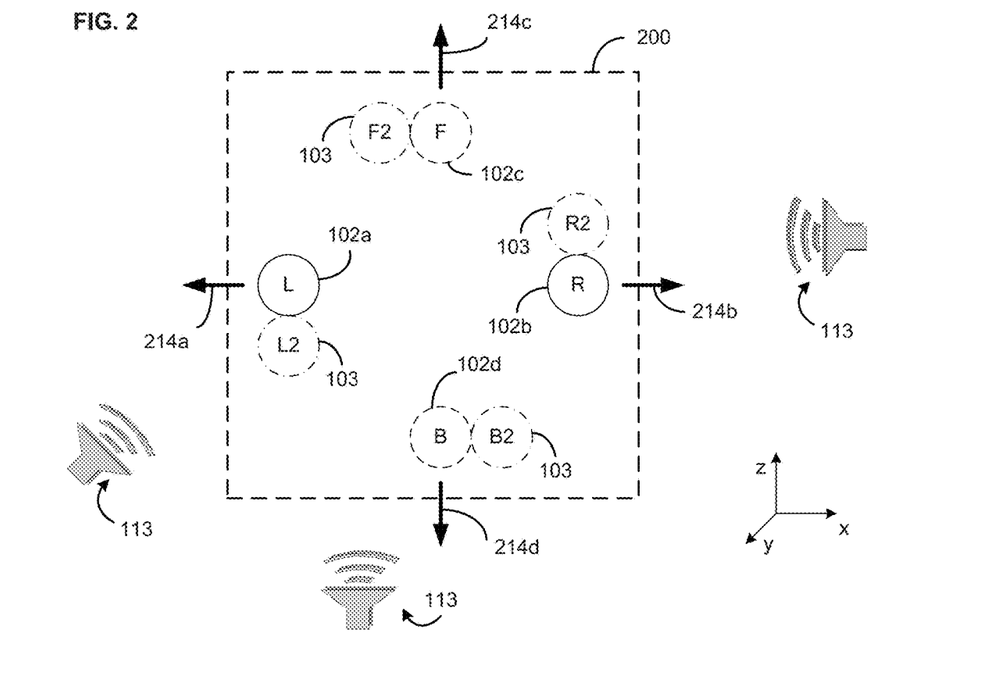
FIG. 2 is a top view of an example microphone arrangement for in a vehicle in accordance with certain embodiments.

FIG. 2 depicts a top view of an example microphone arrangement 200 for positioning the plurality of microphones 102 in a vehicle (not shown) in accordance with certain embodiments. Each of the microphones 102 can have a pick-up sensitivity directed at one of a plurality of sensitivity directions 214 relative to the vehicle and/or vehicle operator. In some embodiments, the plurality of sensitivity directions 214 can be selected to provide nearly 360 degree pick up coverage by pointing towards the four sides of the vehicle. For example, as shown in FIG. 2, a left microphone 102a can be configured for pick-up sensitivity in a left direction 214a, which may correspond to a left side of the vehicle. A right microphone 102b can be configured for pick-up sensitivity in a right direction 214b, which may correspond to a right side of the vehicle and may be directly opposite the left direction 214a. A front microphone 102c can be configured for pick-up sensitivity in a front direction 214c, which may correspond to a front side of the vehicle and may be orthogonal or perpendicular to the left direction 214a. And a back microphone 102d can be configured for pick-up sensitivity in a back direction 214d, which may correspond to a back side of the vehicle and may be directly opposite the front direction 214c.

Referring back to FIG. 1, in some embodiments, the plurality of microphones 102 includes four microphones. In other embodiments, the plurality of microphones 102 may include fewer microphones or more microphones, as indicated by the use of solid and dashed lines in FIG. 2. For example, in some cases, the microphones 102 may only include the left microphone 102a and the right microphone 102b, while in other cases, the microphones 102 can additionally include the front microphone 102c and/or the back microphone 102d, as in FIG. 1. As another example, in some embodiments, the microphone arrangement 200 can further include a second set of microphones 103 that are positioned adjacent to respective microphones 102 and have the same directionality as the adjacent microphone 102, as shown in FIG. 2. The microphones 103 may be configured for a different frequency response range than the microphones 102. For example, the microphones 103 may be configured for one type of predefined warning sound (e.g., emergency vehicle sirens), and the microphones 102 may be configured for another type of predefined warning sound (e.g., car honks).

In another embodiment, the plurality of microphones 102 may further include microphones (not shown) positioned in the space between adjacent pairs of microphones 102 with a directionality designed to cover gaps between the directions 214. For example, the additional microphones may have a pick up sensitivity directed diagonally between orthogonal pairs of the directions 214 (e.g., between the left and front directions 214a, 214c, the right and back directions 214b, 214d, etc.). As will be appreciated, the exact number of microphones 102 included in the microphone arrangement 200 can depend on cost and/or power factors, a desired amount of complexity for the system 100, a desired accuracy for the sound direction detection, and/or a number of other considerations. As will also be appreciated, portions of the circuitry 104 may need to be adjusted to accommodate more or fewer microphones 102 (e.g., with more or fewer circuit paths, filters 110, amplifiers 112, etc.).

Figure 3:
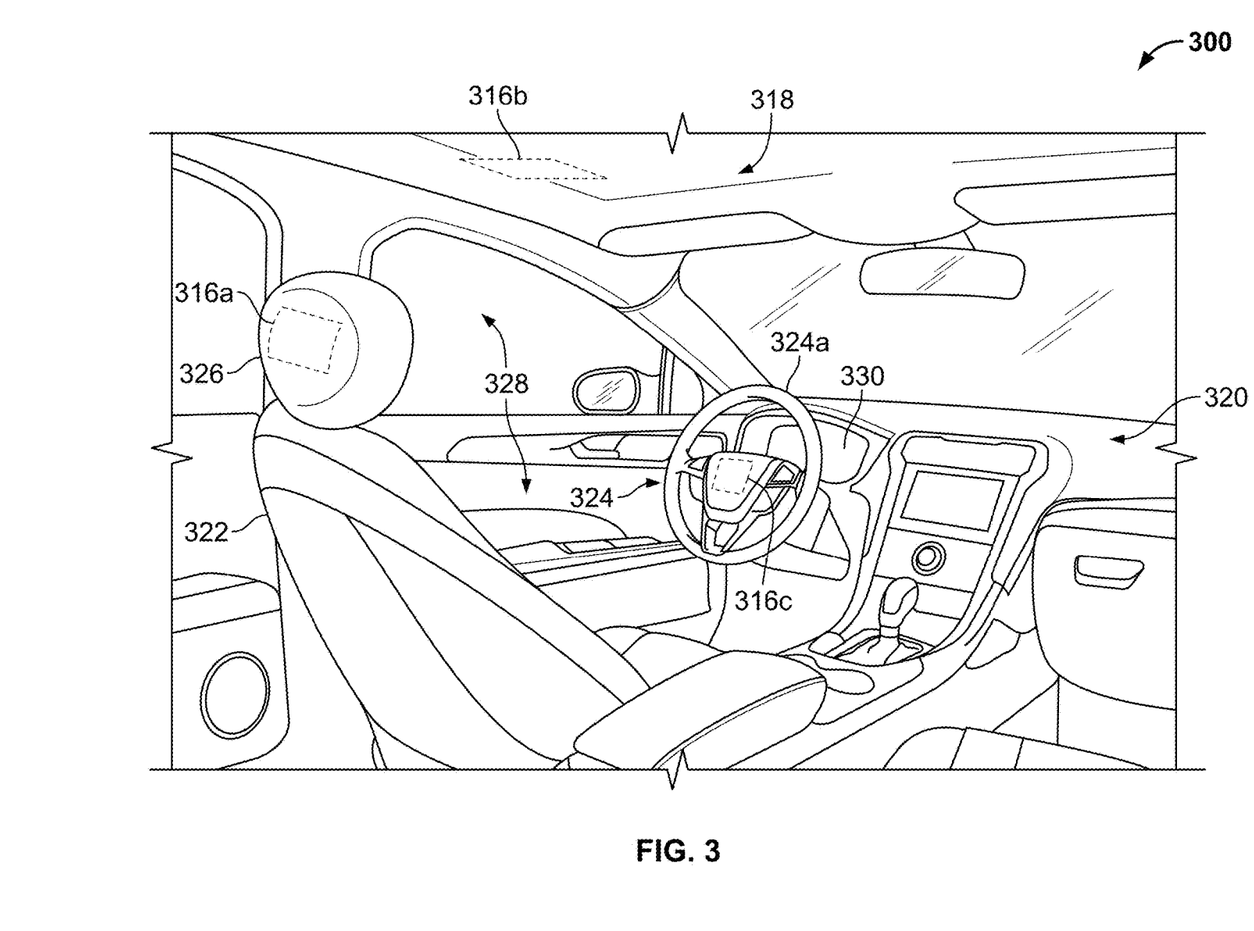
FIG. 3 is an illustration of an example vehicle cabin area and possible locations for the microphone arrangement shown in FIG. 2, in accordance with certain embodiments.

In embodiments, the plurality of microphones 102 positioned in the microphone arrangement 200 can form a substantially flat or planar microphone array that can be placed in a variety of locations throughout the vehicle. As an example, FIG. 3 illustrates an example vehicle 300 and a number of preferred locations 316 for placement of the microphones 102 within the vehicle 300, where the vehicle 300 includes the sound direction detection system 100, in accordance with certain embodiments. As will be appreciated, in other embodiments, the microphones 102 may be placement in other locations throughout the cabin area 320, including, for example, left and right doors of the vehicle 300, a dashboard of the vehicle 300, the driver's seat 322, etc. In still other embodiments, the microphones 102 may be placed on an outer side of the vehicle 300 to be closer to the sound source and provide better sound pick up.

As shown in FIG. 3, the example vehicle 300 comprises a roof 318 and a passenger or cabin area 320. The cabin area 320 includes a driver's seat 322, a steering wheel 324, and a headrest 326 coupled to the driver's seat 322. The driver's seat 322, steering wheel 324, and headrest 326, along with an area of the roof 318 above the driver's seat 322, can define a driver's side vicinity 328. In a preferred embodiment, the microphone placement locations 316 are positioned in the driver's side vicinity 328, so that the microphones 102 can more closely or accurately replicate a driver's hearing experience. For example, by placing the microphones 102 close to the driver's head, the microphones 102 can pick up roadside sounds that the driver would normally hear, or should be aware of while driving.

In FIG. 3, a first possible location 316a for placement of the microphones 102 is in the headrest 326 of the driver's seat 322, in accordance with embodiments. The microphone arrangement 200 may be positioned at any location inside the headrest 326, so long as the left microphone 102a is directed toward a left side of the headrest 326, the right microphone 102b is directed toward a right side of the headrest 326, the front microphone 102c is directed toward the driver's head, or a front side of the headrest 326, and the back microphone 102d is directed away from the driver's head, or a back side of the headrest 326. An exact positioning of the microphones 102 may vary depending on an amount and shape of available space within the headrest 326. In some embodiments, the microphones 102 may be adjacent to a headliner covering the headrest 326 to be as close as possible to the edge(s) of the headrest 326 for better sound pick up.

As also shown in FIG. 3, a second possible location 316b for placement of the microphones 102 is in the roof 318 of the vehicle 300 above the driver's seat 322, in accordance with embodiments. For example, the microphone arrangement 200 may be positioned parallel to the roof 318, in the roof area above the driver's seat 322. In some cases, the microphone arrangement 200 may be centered above the driver's seat 322. In other cases, the microphone arrangement 200 may be at least slightly offset towards the headrest 326, to better approximate the location of a driver's head. In some embodiments, the microphones 102 may be adjacent to a lining or headliner of the roof 318 for better sound pick up.

A third possible location 316c for placement of the microphones 102 is in the steering wheel 324 of the vehicle, as shown in FIG. 3 in accordance with embodiments. As an example, the microphones 102 may be positioned within the steering wheel 324 so that the left microphone 102a is directed toward a left side of the steering wheel 324, the right microphone 102b is directed toward a right side of the steering wheel 324, the front microphone 102c is directed toward a front side of the vehicle 300, or an instrument cluster 330 of the vehicle, and the back microphone 102d is directed toward a back side of the vehicle 300, or the driver's seat 322. An exact positioning of the microphones 102 may vary depending on an amount and shape of available space within the steering wheel 324. In embodiments, the microphones 102 can be positioned in at least one of a central portion of the steering wheel 324 and a rim 324a surrounding the central portion.

Figure 4:
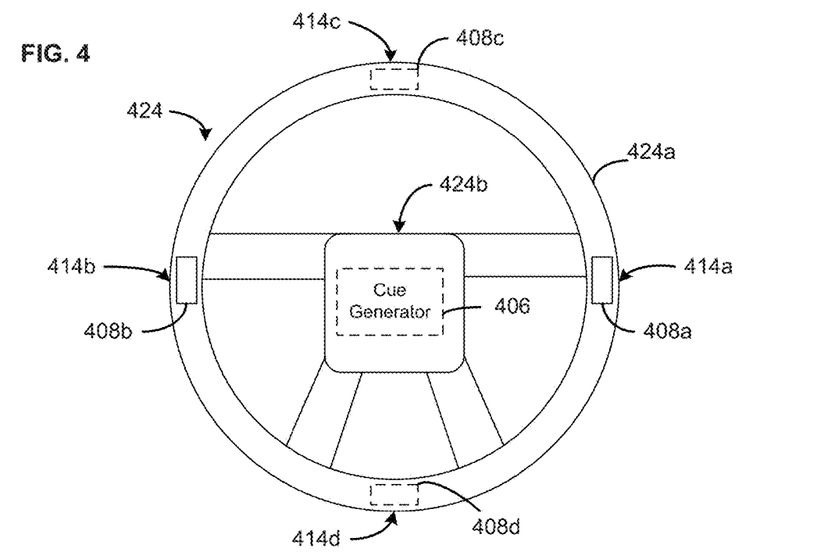
FIG. 4 is an illustration of an example steering wheel comprising a cue generator in accordance with certain embodiments.

Referring additionally to FIG. 4, shown is an example steering wheel 424 comprising a cue generator 406, in accordance with embodiments. The steering wheel 424 includes a rim 424a and a central portion 424b, and may be substantially similar to the steering wheel 324 shown in FIG. 3. The cue generator 406 may be substantially similar to the cue generator 106 shown in FIG. 1. For example, in embodiments, the cue generator 406 may be coupled to the sound direction detection circuit 104 to receive the identity of the microphone 102 that has detected the highest amplitude signal for a given sound (also referred to herein as the "primary detecting microphone").

According to embodiments, the cue generator 406 can include a plurality of haptic devices 408 configured to provide haptic or tactile feedback, such as, for example, forces, vibrations, or motions, to the vehicle operator in response to detection of the given sound. The haptic devices 408 can provide haptic cues that not only alert the vehicle operator to a driving event or other roadside condition that may require the operator's attention (e.g., a car honking at the vehicle, an approaching emergency vehicle, etc.), but also convey a general location of the driving event relative to the operator. In embodiments, the haptic devices 408 are positioned at a plurality of feedback locations 414 in the rim 424a of the steering wheel, so that haptic feedback can be provided adjacent to where the operator's hands are typically positioned during vehicle operation. For example, the haptic devices 408 can be provided at a right side, or "3 o'clock," location 414a and a left side, or "9 o'clock," location 414b on the rim 424a. The haptic devices 408 can be tactors, or any other electronic device that is small enough to fit within the steering wheel rim 424a and includes a very small motor designed to buzz, push, vibrate, or otherwise mechanically stimulate the steering wheel surface upon activation.

In embodiments, the cue generator 406 can be configured to provide a haptic cue at the feedback location 414 that corresponds to a direction to the sound source 113 by activating the haptic device 408 that is associated with the primary detecting microphone 102. More specifically, as shown in FIGS. 2 and 4, the plurality of feedback locations 414 generally correspond to the sensitivity directions 214 of the microphones 102 and/or the placement of the microphones 102 in the microphone arrangement 200. Through this physical correspondence, each haptic device 408 can be associated with a respective one of the microphones 102. Once the sound direction detection circuit 104 detects a sound and outputs the identity of the microphone 102 that produced the highest amplitude signal, the cue generator 406 can be configured to activate the associated haptic device 408, thereby providing a haptic cue at the feedback location 414 that corresponds to a direction to the sound source 113.

For example, in embodiments, the cue generator 406 can include a haptic device 408a positioned at a right side location 414a and configured to provide a haptic cue when the right microphone 102b is identified as detecting the highest amplitude signal by the circuit 104 and/or the comparator 108. Also in embodiments, the cue generator 406 can include a haptic device 408b positioned at a left side location 414b and configured to provide a haptic cue when the left microphone 102b is identified as detecting the highest amplitude signal. In some embodiments, the cue generator 406 can further include a haptic device 408c positioned at a front side location 414c of the steering wheel rim 424a to provide a haptic cue when the front microphone 102c is identified by the comparator 108. In some embodiments, the cue generator 406 can also include a haptic device 408d positioned at a back side location 414d of the steering wheel rim 424a to provide a haptic cue when the back microphone 102d is identified by the comparator 108. As will be appreciated, the cue generator 406 can include more haptic devices 408 at additional feedback locations 414 if the microphone arrangement 200 includes more microphones 102 direction at additional sensitivity directions 214.

In the illustrated embodiment, the cue generator 406 is positioned at least partially in the rim 424a of the steering wheel 406 and partially in the central portion 424b of the steering wheel 406. More specifically, the haptic devices 408 of the cue generator 406 are positioned at various locations on the rim 424a, while a remaining portion of the cue generator 406 is included in the central portion 424b. In such embodiment, the remaining portion of the cue generator 406 may include, for example, connection circuitry (not shown) for coupling the haptic devices 408 to the sound direction detection circuit 104. In other embodiments, the cue generator 406 may be positioned entirely in the rim 424a or the central portion 424b. For example, in one embodiment, the haptic devices 408 are positioned in the central portion 424b at left, right, front, and/or back feedback locations that correspond to the illustrated feedback locations 414. As will be appreciated, the exact location of the cue generator 406 and/or the haptic devices 408 within the steering wheel 424 can depend on an available amount of space within, and a sizing of, the rim 424a and the central portion 424b, as well as other factors, including wiring complexity within the steering wheel 424, the size of each haptic device 408, the total number of haptic devices 408, etc.

According to certain embodiments, the haptic devices 408 may be configured to output different haptic cues based on a frequency of the detected sound, so that the vehicle operator can be alerted to the type of detected sound, as well as the direction from which the sound emanates. For example, the haptic cue for signaling a car horn with a frequency of about 400 Hz may differ from the haptic cue for signaling an emergency vehicle siren with a frequency of about 700 Hz. As an example, the plurality of haptic cues can include a single buzz or vibration, two, three, five, or more buzzes in close succession, or any other haptic output that the haptic devices 408 are capable of producing.

In some embodiments, the cue generator 406 may include a second set of haptic devices (not shown) respectively positioned at each feedback location 414 adjacent to the haptic device 408, and each of the second set of haptic devices may be configured to produce a different haptic cue than the haptic devices 408. In such cases, each of the haptic devices 408 and the second set of haptic devices may be associated with a respective microphone, and the haptic cue assigned to that haptic device may depend on the frequency response of the associated microphone.

For example, referring back to FIG. 2, where each of the microphones 102, 103 positioned at each location 214 in the microphone arrangement 200 may have a different frequency response for detecting different predefined sounds, the second set of haptic devices may be respectively associated with the second set of microphones 103, while the haptic devices 408 may be respectively associated with the plurality of microphones 102. In such cases, each of the haptic devices 408 and the second set of haptic devices may be configured to output only the haptic cue that signifies the frequency response of the associated microphone 102/103. For example, if the microphones 102 are configured to detect car horns, the associated haptic devices 408 may be configured to output only a single buzz, or other haptic cue assigned to car horns, upon activation. Likewise, if the microphones 103 are configured to detect emergency vehicle sirens, the associated second set of haptic devices may be configured to output only a double buzz, or other haptic cue assigned to emergency vehicle sirens, upon activation.

In other embodiments, the cue generator 406 may include a processor (not shown) for determining the appropriate haptic cue based on the frequency of the detected sound, and a memory (not shown) for storing the different haptic cues and the frequency associated with each. In such embodiments, the memory may also store an algorithm or computer software instructions which, when executed by the processor, can cause the haptic device 408 associated with the detecting microphone 102 to output the selected haptic cue.

According to other embodiments, the sound direction detection circuit 104 may be configured to provide sound direction detection alerts to a pre-existing system in the vehicle 300, in addition to, or instead of, the cue generator 406. For example, in some cases, the circuit 104 may be coupled to a dashboard display unit, such as the instrument cluster 330, in order to display thereon a textual or graphical alert corresponding to the detected sound. The displayed alert may include, for example, a textual message urging the vehicle operator to pull over and stop (e.g., in the case of an emergency vehicle siren) or to move over or speed up (e.g., in the case of a car horn). The displayed alert may also, or alternatively, include a graphical or textual message indicating the type of detected sound and the direction from which the sound is emanating.

As another example, in some cases, the circuit 104 may be coupled to an autonomous driving system of the vehicle to alert the autonomous driving system to neighboring vehicles and/or warning signals. In such cases, the autonomous driving system may use the output of the sound direction detection circuit 104 to adjust certain driving behaviors, including, for example, pulling over to the side for a passing emergency vehicle (e.g., in the case of a siren) or moving out of the path of a neighboring vehicle (e.g., in the case of a car horn).

In certain other embodiments, the system 100 may be designed to operate in conjunction with an existing vehicle-to-vehicle ("V-to-V") communication system (not shown). For example, the V-to-V system may receive a communication signal from another vehicle to inform the present vehicle operator of a roadside situation, and the V-to-V signal may be displayed as a textual or graphical message on a display screen of the vehicle. In response, or at the same time, the system 100 may provide a haptic cue representing the same roadside condition. Such redundancy in alert systems may help ensure that the vehicle operator is notified of the roadside condition in a timely manner, especially when audio cues are not an effective option.

In still other embodiments, the cue generator 106 may include a plurality of light-emitting-diodes (LEDs) (not shown) adjacent to each of the microphones 102 at the respective location 214. The LEDs may be configured to provide a visual cue in conjunction with the haptic cue provided by the haptic devices 408. For example, the cue generator 406 may be configured to activate the appropriate LED, as well as the appropriate haptic device 408, in response to the output of the sound direction detection circuit 104.

Figure 5:
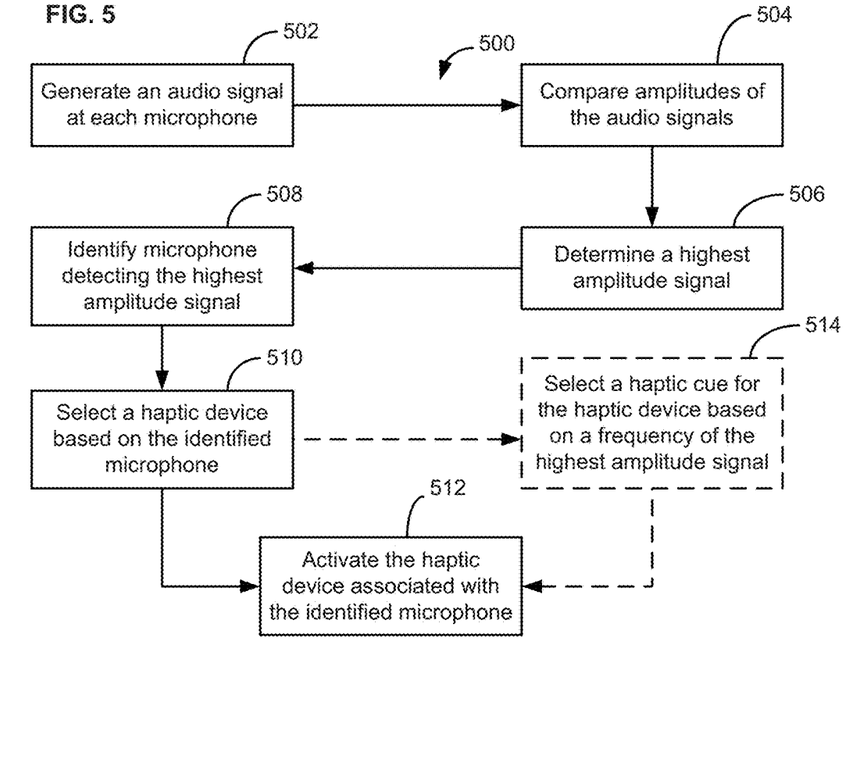
FIG. 5 is a flow diagram of an example method for indicating a detected sound direction in a vehicle in accordance with certain embodiments.

FIG. 5 depicts a flow diagram of an example method 500 for indicating a detected sound direction in a vehicle, such as, for example, the vehicle 300, in accordance with embodiments. In some embodiments, the method 500 can be carried out by, for example, the sound direction detection system 100. As shown, the method 500 can begin at step 502 by generating an audio signal at each of a plurality of microphones (such as, e.g., the microphones 102) positioned within a vehicle cabin (such as, e.g., the cabin area 320 of the vehicle 300). The microphones may generate the audio signals in response to detection of a predefined sound, such as, for example, an alarm, siren, or horn sounding outside the vehicle.

The method 500 can further include, at step 504, comparing the amplitudes of the audio signals using, for example, a comparator (such as, e.g., the comparator 108) and at step 506, determining a highest amplitude signal based on said comparison. Also, at step 508, the method 500 can include identifying the microphone that detected the highest amplitude signal. For example, the microphones may provide the generated audio signals to a circuit (such as, e.g., the sound direction detection circuit 104) that is configured to determine which of the microphones picked up the detected sound with the highest amplitude. More specifically, a comparator included in the circuit may be configured to compare the amplitudes of the received audio signals against each other to determine which of the signals has the highest amplitude and to generate an output that identifies the microphone that detected the sound with the highest amplitude.

In embodiments, the method 500 can further include, at step 510, based on the identified microphone, selecting a haptic device from a plurality of haptic devices (such as, e.g., the haptic devices 408) mounted on a steering wheel (such as, e.g., the steering wheel 424a) of the vehicle. The method 500 also includes, at step 512, activating the haptic device that is associated with the microphone that detected the highest amplitude signal. For example, each haptic device may be associated with a respective one of the plurality of microphones and may be mounted in one of a plurality of vehicle cabin locations (such as, e.g., the feedback locations 414). The plurality of microphones may be configured to have pick-up sensitivity in select directions (such as, e.g., the sensitivity directions 214) that correspond to the vehicle cabin locations. In embodiments, the sound direction detection circuit may include a cue generator (such as, e.g., the cue generator 106) that is configured to select the haptic device that has a vehicle cabin location corresponding to the pick-up sensitivity direction of the microphone that detected the highest amplitude signal. In this manner, a haptic cue can be provided to alert the vehicle operator to the detection of a sound outside the vehicle and indicate the direction from which the sound is coming.

In some embodiments, the haptic devices may be configured to output different haptic cues depending on a frequency of the detected sound. For example, each of the plurality of haptic cues may be assigned to a respective one of a plurality of frequency ranges, so that each haptic cue signifies a different predefined sound (e.g., a car horn, an emergency vehicle siren, etc.). In some cases, the plurality of microphones may include a first set of microphones configured for a first frequency response (e.g., the microphones 102) and a second set of microphones configured for a second frequency response (e.g., the microphones 103). In such cases, the haptic devices associated with each set of microphones may be configured to output a different one of the haptic cues to signify the type of sound detected. In other cases, the method 500 further includes, before activating the haptic device at step 512, a step 514 for selecting one of a plurality of different haptic cues based on a frequency of the highest amplitude signal. For example, the cue generator may include a memory for storing the plurality of haptic cues and the associated frequency ranges. Further, the cue generator may include a processor configured to select one of the haptic cues based on the frequency of the detected sound and to cause the selected haptic device to output the selected haptic cue upon activation.

In certain embodiments, the process descriptions or blocks in the figures, such as FIG. 5, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle, comprising:
   microphones at cabin locations to collect audio signals;
   filters to isolate frequencies of the audio signals corresponding with vehicle warning sounds;
   a circuit to identify a primary microphone that collected a highest amplitude within the isolated frequencies;
   haptic devices at feedback locations in a steering wheel corresponding with the microphone locations; and
   a cue generator to
      provide a haptic cue via a first of the haptic devices corresponding with the primary microphone.

2. The vehicle of claim 1, further comprising a cabin and a driver's seat within the cabin, wherein the cabin locations of the microphones are positioned in a vicinity of the driver's seat.

3. The vehicle of claim 2, further comprising a headrest coupled to the driver's seat, wherein the microphones are mounted in the headrest at the cabin locations.

4. The vehicle of claim 2, further comprising a roof, wherein the microphones are mounted in the roof above the driver's seat at the cabin locations.

5. The vehicle of claim 2, wherein the steering wheel is located in the driver's seat vicinity and the microphones are mounted in the steering wheel at the cabin locations.

6. The vehicle of claim 1, wherein the microphones include:
   a first microphone configured to have pick-up sensitivity in a first direction relative to the cabin, and
   a second microphone configured to have pick-up sensitivity in a second direction opposite the first direction.

7. The vehicle of claim 6, wherein the microphones further include:
   a third microphone configured to have pick-up sensitivity in a third direction that is orthogonal to the first direction, and
   a fourth microphone configured to have pick-up sensitivity in a fourth direction opposite the third direction.

8. The vehicle of claim 6, wherein the microphones further include:
   a third microphone configured to have pick-up sensitivity in the first direction, and
   a fourth microphone configured to have pick-up sensitivity in the second direction,
   wherein the first and second microphones have a first frequency response range and the third and fourth microphones have a second frequency response range different from the first range.

9. The vehicle of claim 1, wherein the haptic devices are mounted in a rim of the steering wheel at the feedback locations.

10. The vehicle of claim 9, wherein the haptic devices are arranged on the steering wheel at the feedback locations based on pick-up sensitivity directions of the microphones such that each of the haptic devices corresponds with a respective one of the microphones.

11. The vehicle of claim 10, wherein the circuit is configured to provide an output signal to the cue generator for activating the first of the haptic devices corresponds with the primary microphone of the microphones.

12. The vehicle of claim 1, wherein the filters isolate the frequencies of between 200 Hz and 1000 Hz.

13. The vehicle of claim 1, wherein the filters isolate the frequencies of less than 1000 Hz.

14. A system for indicating a detected sound direction in a vehicle, comprising:
   microphones positioned at microphone locations in a vehicle cabin and configured to have pick-up sensitivities in select directions to collect audio signals;
   filters to isolate frequencies of the audio signals corresponding with vehicle warning sounds;
   a comparator configured to compare the isolated frequencies of the audio signals to identify one of the microphones that collected a highest amplitude signal within the isolated frequencies;
   a plurality of haptic devices arranged at feedback locations in a steering wheel that correspond with the microphone locations of the microphones; and
   a cue generator configured to:
      select a stored haptic cue based on which of the microphones collected the highest amplitude signal and a frequency of the highest amplitude signal; and
      provide the haptic cue via one of the haptic devices corresponding with the one of the microphones that collected the highest amplitude signal.

15. The system of claim 14, wherein the haptic devices are mounted in a rim of the steering wheel.

16. The system of claim 15, wherein each of the microphones corresponds with a respective one of the haptic devices.

17. The system of claim 16, wherein the feedback locations correspond to pick-up sensitivity directions of the microphones.

18. A method of indicating a detected sound direction in a vehicle, comprising:
   collecting an audio signal via each of a plurality of microphones positioned at microphone locations within a vehicle cabin;
   filtering the audio signal collected by the plurality of microphones to isolate frequencies corresponding with vehicle warning sounds;
   determining, using a comparator, one of the plurality of microphones that collected a highest amplitude signal within the isolated frequencies;
   selecting, using a cue generator disposed in a steering wheel of the vehicle, a stored haptic cue based on a frequency of the highest amplitude signal; and
   activating, according to the haptic cue, a haptic device mounted in the steering wheel and associated with the one of the plurality of microphones detecting the highest amplitude signal.

19. The method of claim 18, wherein the haptic device is one of a plurality of haptic devices mounted in the steering wheel and further comprising selecting the haptic device from the plurality of haptic devices, each haptic device being associated with a respective one of the plurality of microphones.

20. The method of claim 18, wherein the plurality of microphones are configured to have pick-up sensitivity in select directions, and a mounting location of the haptic device in the steering wheel corresponds to the pick-up sensitivity direction of the one of the plurality of microphones that detected the highest amplitude signal.

* * * * *